United States Patent
Hermann

(10) Patent No.: US 7,146,405 B2
(45) Date of Patent: Dec. 5, 2006

(54) COMPUTER NODE ARCHITECTURE COMPRISING A DEDICATED MIDDLEWARE PROCESSOR

(75) Inventor: Kopetz Hermann, Baden-Siegenfeld (AT)

(73) Assignee: FTS ComputerTechnik Ges.m.b.H, Baden-Siegenfeld (AT)

(*) Notice: Subject to any disclaimer, the term of this patent is extended or adjusted under 35 U.S.C. 154(b) by 0 days.

(21) Appl. No.: 10/233,057

(22) Filed: Aug. 30, 2002

(65) Prior Publication Data

US 2006/0036772 A1 Feb. 16, 2006

Related U.S. Application Data

(63) Continuation of application No. PCT/AT01/00058, filed on Mar. 1, 2001.

(30) Foreign Application Priority Data

Mar. 2, 2000 (AT) ................. A 342/2000

(51) Int. Cl.
*G06F 15/167* (2006.01)
*G06F 15/00* (2006.01)
*G06F 13/36* (2006.01)

(52) U.S. Cl. ............... 709/213; 712/17; 710/310
(58) Field of Classification Search ............. None
See application file for complete search history.

(56) References Cited

U.S. PATENT DOCUMENTS

| 4,862,407 | A | * | 8/1989 | Fette et al. ............... 712/35 |
| 5,321,819 | A | * | 6/1994 | Szczepanek ............ 709/228 |
| 5,495,522 | A | * | 2/1996 | Allen et al. ........... 379/202.01 |
| 5,506,999 | A | * | 4/1996 | Skillman et al. ........... 718/105 |
| 5,524,261 | A | * | 6/1996 | Daly et al. ............... 710/241 |
| 5,634,015 | A | * | 5/1997 | Chang et al. ............ 710/310 |

* cited by examiner

*Primary Examiner*—Wen-Tai Lin
(74) *Attorney, Agent, or Firm*—Thomas R. Vigil; Welsh & Katz, Ltd.

(57) ABSTRACT

The computer node architecture provides a separate computer for the execution of the respective one of the application software and the middleware software, with an interface precisely defined in the time and value range provided between said two computers, and thus to decouple largely these two subsystems so that development is improved and the time needed for real-time applications better foreseeable.

6 Claims, 1 Drawing Sheet

COMPUTER NODE ARCHITECTURE COMPRISING A DEDICATED MIDDLEWARE PROCESSOR

CROSS REFERENCE TO RELATED APPLICATIONS

This application is a Continuation of PCT/AT01/00058 filed Mar. 01, 2001 and claims priority from Austrian Patent Application No. A 342/2000 filed Mar. 2, 2000

BACKGROUND OF THE INVENTION

1. Field of the Invention

The invention relates to a multi-computer node computer for a distributed computer system.

2. Description of the Prior Art

In a distributed, fault-tolerant real-time computer system consisting of a number of node computers and of a real-time communication system, the node computers must execute the application software and diverse administrative tasks, the "middleware tasks" such as selection of peripherals, message administration, network management, and so on. The many implicit interactions between these tasks, which are but slightly dependent, make it difficult to foresee the time required to execute the application software. The literature see e.g. Anceaume, E., et. Al. (1998). HADES: *A Middleware Support for Distributed Safety-Critical Real-Time Applications. Proc. of the 18$^{th}$ Distributed Computer System Conference* (DCS 18), IEEE Press. pp. 344–351; Janka, R. (1999). *A New Development Framework Based on Efficient Middleware for Real-Time Embedded Heterogenous Multicomputers. Proc. of Engineering of Computer Based Systems* (ECBS 99), IEEE Press. pp. 261–268; Kim, K. (1998). ROAFTS: *A Middleware Architecture for Real-Time Object Oriented Adaptive Fault Tolerance Support. Proc. of the 3$^{rd}$ International High Assurance System Engineering Symposium*, IEEE Press. pp. 50–57 suggests to encapsulate the middleware software in software objects of its own in order to decouple the middleware software from the application software. In the time range, this decoupling is incomplete since one and the same CPU must undertake the temporally imbricated execution of the application software and the middleware software and since additional, undesired dependencies are generated by the common use of resources such as a cache memory of the CPU for example.

BRIEF SUMMARY OF THE INVENTION

It is an object of the invention to achieve, in real-time computer systems, a largest possible decoupling between the middleware software and the application software.

The solution to this object is achieved with a multicomputer node computer as mentioned herein above comprising, in accordance with the invention, the following units: at least one host computer with a dedicated CPU and a dedicated memory, at least one middleware computer with a dedicated CPU and a dedicated memory, and at least one communication system connected to the middleware computer and, by way of at least one communication channel, with other node computers of the distributed computer system, an interface being provided between the host computer and the middleware computer, said interface consisting of a dual-ported random access memory (DPRAM) to which the middleware computer accesses in reading or in writing during time intervals specified beforehand and to which the host computer can access in reading or in writing out of these time intervals specified beforehand, the interface between the host computer and the middleware computer including additionally a distinct memory cell, the time cell, into which the middleware computer periodically writes the actual time.

The present invention proposes a node computer architecture in which the application software is executed on a dedicated host computer that is connected to a middleware computer by way of a timed data interface fully specified beforehand. In such an architecture, the administrative tasks can be performed by the middleware computer which, in time, writes the data needed by the application to the data interface or reads them therefrom.

In transferring the application tasks to a dedicated host computer having a data interface to the middleware computer precisely defined in the value and time range the following advantages may be realized:

As soon as the interface between host computer and middleware computer is specified, the application software may be developed and tested irrespective of the rest of the system. This permits to reduce the development time of large systems.

A once tested application software may be reused in different system environments when the given interface specification between host computer and middleware computer is respected.

The middleware software, which is decoupled from the application software, can be prepared automatically by means of software tools.

BRIEF DESCRIPTION OF THE SEVERAL VIEWS OF THE DRAWINGS

The invention and the advantages thereof are explained in greater detail with the aid of exemplary embodiments that are illustrated in closer detail in the drawing.

A realization of the new method is shown hereinafter by way of an example with four multicomputer node computers communicating via a common bus.

DETAILED DESCRIPTION OF THE INVENTION

Figure 1:
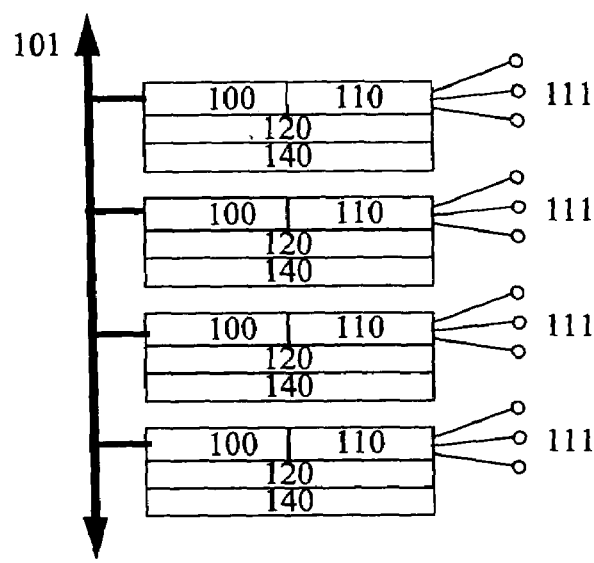
FIG. 1 shows the structure of a distributed computer system with four node computers and FIG. 2 shows the structure of a multicomputer node computer consisting of a host computer, a middleware computer, a communication control unit and the connection of a process interface system.

FIG. 1 shows a system of four multicomputer node computers that exchange data via a common bus 101. Each node computer is provided with a communication controller 100 to the common bus 101, a process I-O controller 110 connected to the sensors and actuators 111, as well as a middleware computer 120 with a CPU of its own and a host computer 140.

Figure 2:
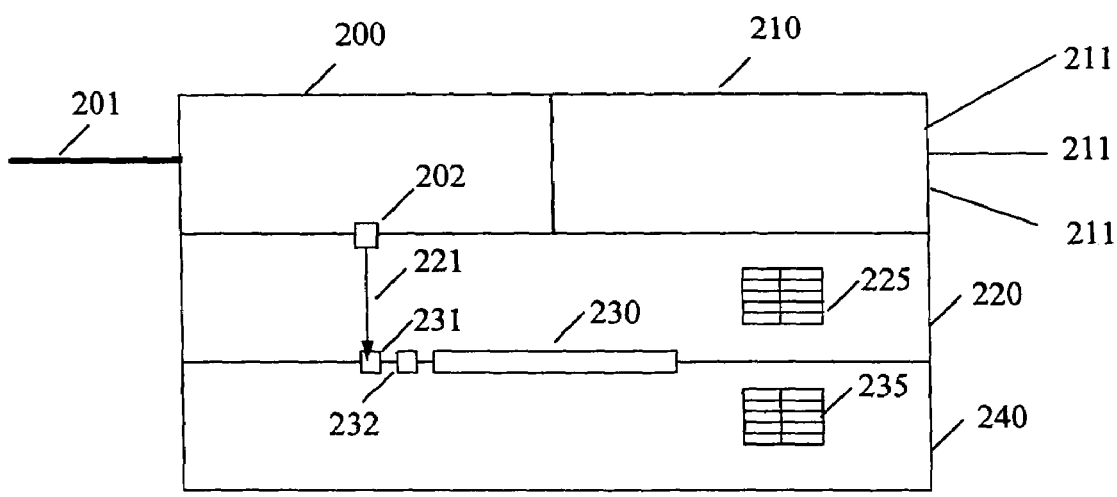

FIG. 2 furthermore shows the inner structure of a multicomputer node computer. The communication controller 200 is connected to the common bus 101 by way of a stub line 201. Via lines 211 or via a field bus the I-O controller 210 reads and writes the signals to the sensors and actuators 111. The two controllers, the communication controller 200 and the I-O controller 210 are both controlled by the middleware computer 220. The middleware computer 220 is provided with a memory and a CPU of its own as well as with the software needed. A data interface 230 between the middleware computer 220 and the host computer 240 is formed by a common memory range ("dual ported RAM") which may be addressed by the two computers. In a data structure 225 there is indicated when the middleware computer 220 is allowed to write into the data interface 230 to the host computer 240 and when it is allowed to read from said interface 230. In an analogous manner, there is indicated in a data structure 235 when the host computer 240 is allowed to write into the data interface 230 and when it is allowed to read from said interface. When all the communication controllers 100 which are connected via the bus 101 build up a global time together, said global time is periodically written into a register 202 and concurrently, per hardware via a signal line 221, into a register 231 in the interface 230 between the middleware computer 220 and the host computer 240. A method for building up a global time in a distributed computer system has been published in the European Patent EP 658 257 and in the U.S. Pat. Nos. 4,866,606 and 5,694,542. Finally, the interface 230 between middleware computer 220 and host computer 240 may also include a timer that generates a hardware-interrupt in the host computer 240 when the content of the time cell 231 reaches a value recorded in the distinct memory cell 232 in the interface 230 by the host computer 240 for example.

The host computer 240 may also be connected to the middleware computer 220 by way of a serial communication channel. In this case, the middleware computer must send messages to the host computer 240 by way of said serial communication channel at fixed times indicated in the data structure 225. Each of these messages must carry the actual time which has to be entered in a distinct field, the time cell 231. The host computer 240 must send messages to the middleware computer 220 at the times indicated in the data structure 235.

The host computer 240 may be a COTS computer ("commercial off the shelf"), a personal computer for example, which is connected to the middleware computer 220 by way of a standard interface such as a PCI interface for example.

In operation, the middleware computer 220 supplies the host computer 240 in proper time with all the data needed via the interface 230 and receives at given times the results of the host computer 240 before transmitting said results to the other node computers of the process peripherals. The middleware computer 220 can perform these administrative tasks of the system without exercising an influence on the application. Since the host computer 240 is capable of executing the application software without any interruption, it is much easier to calculate the maximum execution time ("Worst-case execution time"—WCET) of the application processes beforehand.

In a fault-tolerant system, a number of replicated node computers form a fault-tolerant unit (FTU). According to the fault hypothesis, as long as a minimum number of node computers of one FTU is working, the efficiency of the FTU is maintained—even in case of a fault (see e.g., Kopetz, H. (1997), Real-Time Systems, *Design Principles for Distributed Embedded Applications*; ISBN: 0-7923-9894-7, Third printing 1999. Boston. Kluwer Academic Publishers, page 131). In such a fault tolerant configuration, the middleware computer 220 of each node computer is capable of taking over the tasks of message reduction and voting. As the voted messages are delivered to the interface 230 at the same time as in systems that are not fault-tolerant, the mechanisms of the fault-tolerance for host computer 240 are transparent in this architecture, i.e., the application software in host computer 240 needs not be altered to introduce fault-tolerance.

I claim:

1. A multicomputer node computer for a distributed computer system comprising the following units:
at least one host computer (140, 240) with a dedicated CPU and a dedicated memory, at least one middleware computer (120, 220) with a dedicated CPU and a dedicated memory, and at least one communication system (101) connected to the middleware computer (120, 220) and, by way of at least one communication channel, with other node computers of the distributed computer system, an interface (230) being provided between said host computer (240) and said middleware computer (220), said interface comprising a dual access memory (DPRAM) to which the middleware computer (220) accesses in reading or in writing during time intervals specified beforehand and to which the host computer (240) can access in reading or in writing out of these time intervals specified beforehand, the interface (230) between the host computer (240) and the middleware computer (220) including additionally a distinct memory cell, a time cell (231), into which the middleware computer (220) periodically writes the actual time, wherein the communication system (101) builds up a global time and that the content of the time cell (231) in the interface (230) between host computer (240) and middleware computer (220) is periodically updated directly by a local communication controller (200) of the communication system by way of a hardware signal line (221) and wherein the middleware computer is dedicated to performing administrative tasks by way of executing a set of middleware software and synchronizing memory access with the host computer such that the host computer can be dedicated to the execution of application software in a deterministic fashion without interferences of the middleware computer and the communication system.

2. The node computer of claim 1, wherein another storage place (232), into which the host computer (240) can enter a time value and in which hardware can generate an interrupt signal for the host computer (240) as soon as the content of the time cell (231) corresponds to the time value in said another storage place (232), is present in the interface (230) between said host computer (240) and said middleware computer (220).

3. The node computer of claim 1, wherein the middleware computer (220) enters a global time from an external time base.

4. The node computer of claim 1, wherein the host computer (240) used is a commercial-off-the shelf (COTS) computer which is connected to the middleware computer by way of a standard interface.

5. The node computer of claim 1, wherein the interface (230) between middleware computer (220) and host computer (240) is configured as a serial communication interface by way of which, at times determined beforehand, the middleware computer (220) sends messages that contain, in a distinct address, the actual time value (231).

6. The node computer of claim 1, wherein, in introducing fault-tolerance by replication of the node computers, neither the time behavior nor the values behavior of the interface (230) between middleware computer (220) and host computer (240) are altered as compared to a non-fault tolerant configuration.

* * * * *

UNITED STATES PATENT AND TRADEMARK OFFICE
CERTIFICATE OF CORRECTION

PATENT NO. : 7,146,405 B2 Page 1 of 1
APPLICATION NO. : 10/233057
DATED : December 5, 2006
INVENTOR(S) : Hermann Kopetz It is certified that error appears in the above-identified patent and that said Letters Patent is hereby corrected as shown below:

Title Page, Item (75) Inventors: Delete "Kopetz, Hermann, Baden-Siegenfeld (AT)"

and insert --Kopetz, Hermann, Baden-Sigenfeld (AT)--;

Column 4, line 13, after "dual" insert -- -ported random --;

Signed and Sealed this

First Day of May, 2007

JON W. DUDAS
*Director of the United States Patent and Trademark Office*